(12) United States Patent
Shalumov et al.

(10) Patent No.: US 12,008,817 B2
(45) Date of Patent: Jun. 11, 2024

(54) SYSTEMS AND METHODS FOR DEPTH ESTIMATION IN A VEHICLE

(71) Applicant: GM GLOBAL TECHNOLOGY OPERATIONS LLC, Detroit, MI (US)

(72) Inventors: Albert Shalumov, Petah Tikva (IL); Michael Slutsky, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 17/198,954

(22) Filed: Mar. 11, 2021

(65) Prior Publication Data

US 2022/0292289 A1 Sep. 15, 2022

(51) Int. Cl.
| | |
|---|---|
| *G06V 20/58* | (2022.01) |
| *G06F 18/214* | (2023.01) |
| *G06F 18/22* | (2023.01) |
| *G06N 3/04* | (2023.01) |
| *G06N 3/08* | (2023.01) |

(Continued)

(52) U.S. Cl.
CPC ............ *G06V 20/58* (2022.01); *G06F 18/214* (2023.01); *G06F 18/22* (2023.01); *G06N 3/04* (2013.01); *G06N 3/08* (2013.01); *G06T 5/70* (2024.01); *G06T 7/13* (2017.01); *G06T 7/55* (2017.01); *G06V 30/274* (2022.01); *H04N 7/181* (2013.01); *H04N 23/698* (2023.01); *H04N 23/90* (2023.01); *G05D 1/0246* (2013.01); *G06T 2207/20081* (2013.01); *G06T 2207/20084* (2013.01); *G06T 2207/30261* (2013.01)

(58) Field of Classification Search
None
See application file for complete search history.

(56) References Cited

U.S. PATENT DOCUMENTS

2020/0160533 A1* 5/2020 Du ........................... G06N 3/08
2021/0118184 A1* 4/2021 Pillai ....................... G06T 7/50

(Continued)

OTHER PUBLICATIONS

Godard et al. "UnsupervisedMonocular Depth Estimation with Left-Right Consistency", arXiv:1609.03677v3 [cs.CV] Apr. 12, 2017 (Year: 2017).*

(Continued)

*Primary Examiner* — Randolph I Chu
(74) *Attorney, Agent, or Firm* — Lorenz & Kopf LLP

(57) ABSTRACT

Methods and system for training a neural network for depth estimation in a vehicle. The methods and systems receive respective training image data from at least two cameras. Fields of view of adjacent cameras of the at least two cameras partially overlap. The respective training image data is processed through a neural network providing depth data and semantic segmentation data as outputs. The neural network is trained based on a loss function. The loss function combines a plurality of loss terms including at least a semantic segmentation loss term and a panoramic loss term. The panoramic loss term includes a similarity measure regarding overlapping image patches of the respective image data that each correspond to a region of overlapping fields of view of the adjacent cameras. The semantic segmentation loss term quantifies a difference between ground truth semantic segmentation data and the semantic segmentation data output from the neural network.

17 Claims, 4 Drawing Sheets

(51) Int. Cl.
*G06T 5/70* (2024.01)
*G06T 7/13* (2017.01)
*G06T 7/55* (2017.01)
*G06V 30/262* (2022.01)
*H04N 7/18* (2006.01)
*H04N 23/698* (2023.01)
*H04N 23/90* (2023.01)
*G05D 1/00* (2006.01)

(56) References Cited

U.S. PATENT DOCUMENTS

2022/0237866 A1* 7/2022 Stein .................. G06T 7/292
2022/0292289 A1* 9/2022 Shalumov ............ G06K 9/6215

OTHER PUBLICATIONS

Bhoi, A., Monocular Depth Estimation: A Survey. Department of computer Science University of Illinois at Chicago. CoRR abs/1901.09402 (Jan. 27, 2019).

* cited by examiner

SYSTEMS AND METHODS FOR DEPTH ESTIMATION IN A VEHICLE

INTRODUCTION

The present disclosure generally relates to depth estimation based on image data from cameras mounted to a vehicle, and more particularly relates to methods and systems for estimating depth based on surround view image data.

Accurate depth data is important for many vehicle systems, both existing and future. From obstacle prediction to informative user interfaces, depth data facilitates vehicle usage. One method for obtaining depth data is by adding LiDARs to a vehicle sensor suite. Another method employed is to use a pair of closely placed front-facing cameras and solve for depth.

LiDARs add hardware and maintenance costs to the vehicle and have significant power requirements. Further, LiDAR provides sparse depth measurements such that additional processing is still required to convert it to dense data. Stereo cameras also require additional sensors to be fitted to the vehicle.

Accordingly, it is desirable to provide systems and methods that can supply dense depth data with minimal hardware costs added to vehicles that already include cameras covering the vehicle surroundings. Furthermore, other desirable features and characteristics of the present invention will be apparent from the subsequent detailed description and the appended claims, taken in conjunction with the accompanying drawings and the foregoing technical field and background.

SUMMARY

[This section will be completed once the claims have been agreed with the inventors].

DESCRIPTION OF THE DRAWINGS

The present disclosure will hereinafter be described in conjunction with the following drawing figures, wherein like numerals denote like elements, and wherein.

DETAILED DESCRIPTION

Figure 1:
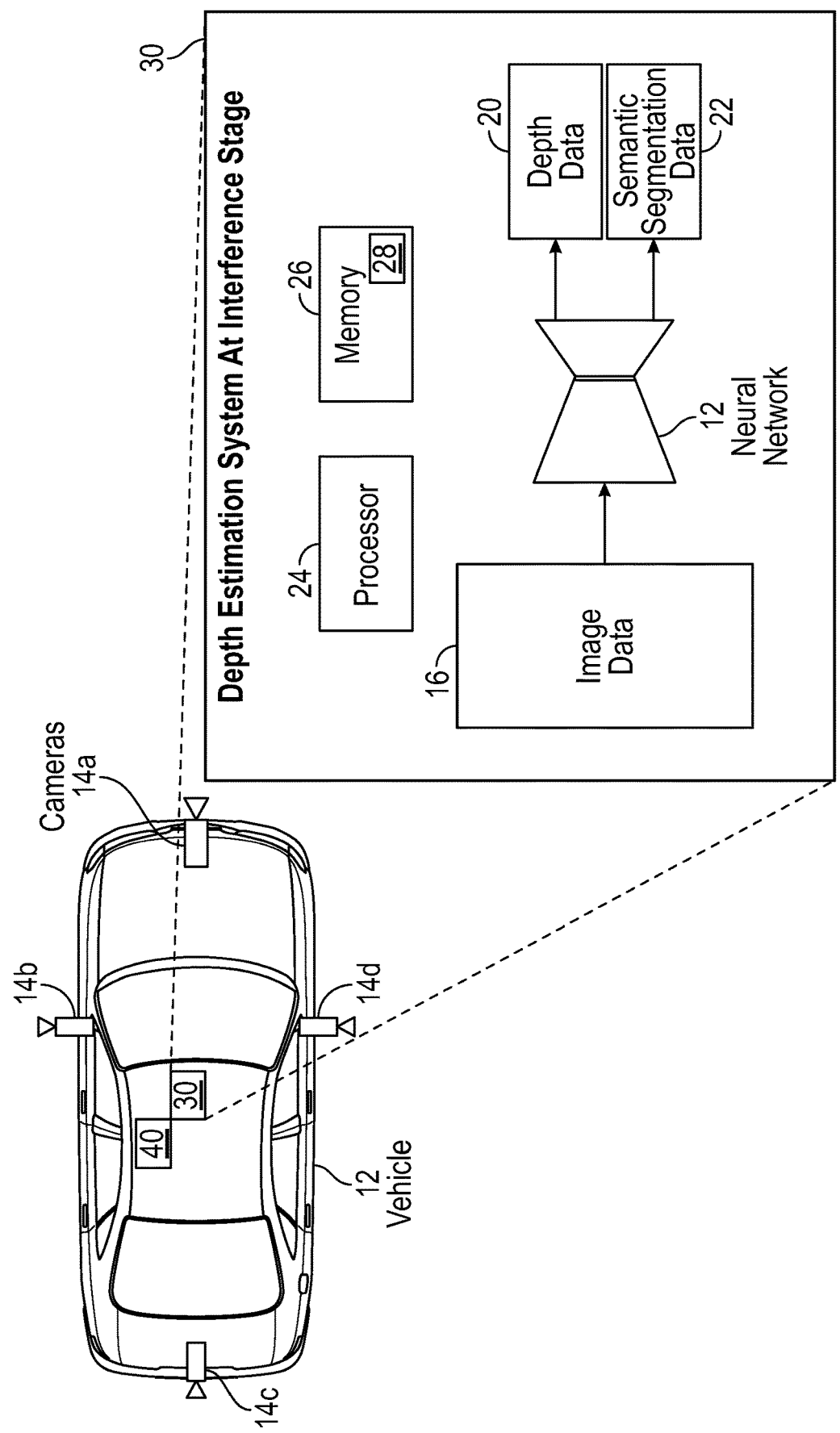
FIG. 1 is a functional block diagram of a system for depth estimation at an inference stage, in accordance with an exemplary embodiment.

The following detailed description is merely exemplary in nature and is not intended to limit the disclosure or the application and uses thereof. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Described herein are systems and methods to estimate a dense depth map from input images from a plurality of cameras mounted to a vehicle. The dense depth map is estimated by processing the images using a Deep Neural Network (DNN): One possible DNN includes an encoder-decoder architecture to generate depth data and semantic segmentation data. In one embodiment, the DNN is trained based on a loss function that combines loss terms including disparity (1/depth) loss, disparity smoothness loss, semantic segmentation loss, and panoramic loss. The loss function is a single multi-task learning loss function. The depth data output by the trained DNN can be used in a variety of vehicular applications including image splicing or stitching, estimating distance from obstacles and controlling the vehicle to avoid the obstacles, dense depth prediction, view perspective change and surround view generation.

In some embodiments, image data from surround cameras is processed by the DNN to force consistency in depth estimation. The surround cameras may be wide lens cameras. The panoramic loss term uses reprojection to a common viewpoint of the images of the surround cameras as part of the loss function. In particular, a similarity measure is taken that compares overlapping image patches from adjacent surround view cameras.

Systems and methods described herein generating dense depth estimation from vehicle surround cameras using the DNN. The DNN employs multi-task learning and co-learns both depth and semantic segmentation. As part of evaluating the panoramic loss term, known camera extrinsic and intrinsic parameters as well as inferred depth are used to generate a 3D point cloud. The 3D point cloud is projected to a common plane to provide a panoramic image. The panoramic loss terms assesses similarity of overlapping regions of the panoramic image as part of the loss function. The loss function may combine disparity, its smoothness, semantic segmentation and panoramic loss in a single loss function.

FIG. 1 illustrates a system 30 for estimating depth and performing semantic segmentation on image data 16 received from a plurality of cameras 14a to 14d mounted to a vehicle 12. The depth estimation system 30 is included in the vehicle 12 and includes a processor 24, a memory 26 and a neural network 18. The cameras 14a to 14d are mounted to the vehicle 12 at a plurality of different locations to provide surround images. In the illustrated embodiment, there are four cameras 14a to 14d. A first camera 14a is a front facing camera. A second camera 14b is a left facing camera. A third camera 14c is a rear facing camera. A fourth camera 14d is a right facing camera. Fewer or greater numbers of cameras 14a to 14d can be included in the vehicle 12. The cameras 14a to 14d are wide angle cameras in one embodiment, also known as fisheye lens cameras. The first/front camera 14a has a partly overlapping field of view with the second/left camera 14b and with the fourth/right camera 14d. The second/left camera 14b has a partly overlapping field of view with the third/rear camera 14c and with the first/front camera 14a. The fourth/right camera 14d has a partly overlapping field of view with third/rear camera 14c and with the first/front camera 14a. In this way, image data 16 output from the cameras 14a to 14d provides a 360° surround view around the vehicle 12. The cameras 14a to 14d can provide color image data 16 such as Red, Green, Blue (RGB) image data 16.

The system 30 is shown in the context of (e.g. included within) a vehicle 12, specifically an automobile. The system 30, however, is useful in other vehicular contexts such as aircraft, sea vessels, etc. In various embodiments, the vehicle 12 is an autonomous vehicle and the system 30 is incorporated into the autonomous vehicle 12. However, the system 30 is useful in any kind of vehicle (autonomous or otherwise) that includes surround cameras 14a to 14d that produce image data 16 that can be combined and processed by the neural network 18 to infer depth data 20 and semantic segmentation data 22. The autonomous vehicle 12 is, for example, a vehicle that is automatically controlled to carry passengers from one location to another. The vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 12 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In embodiments, the vehicle 12 includes a vehicle controller 40 that controls one or more vehicular functions based on at least depth data 20 and optionally also the semantic segmentation data 22. The vehicle controller 40 may include one or more advanced driver-assistance systems providing electronic driver assistance based on the outputs from the neural network 18. The vehicle controller 40 may include an autonomous driver or semi-autonomous driver controlling the vehicle 12 through one or more vehicle actuators (e.g. actuators of propulsion, braking and steering systems) based on the depth data 20 and the semantic segmentation data 22. In embodiments, the vehicle controller 40 includes control modules receiving depth data 20 and the semantic segmentation data 22 in order to determine control instructions to be applied to the vehicle actuators. The control modules of the vehicle controller 40 may run localization and environmental perception algorithms that process the depth data 20 and the semantic segmentation data 22 in order to determine the control instructions. The control modules can include an obstacle detection and avoidance module that processes the depth data 20 and the semantic segmentation data 22 to evaluate the type of obstacles and the three dimensional location of the obstacles. The obstacles are tracked and their trajectory in three dimensions can be predicted. The vehicle controller 40 can responsively control the vehicle 12 to avoid collisions with the tracked obstacles.

Figure 2:
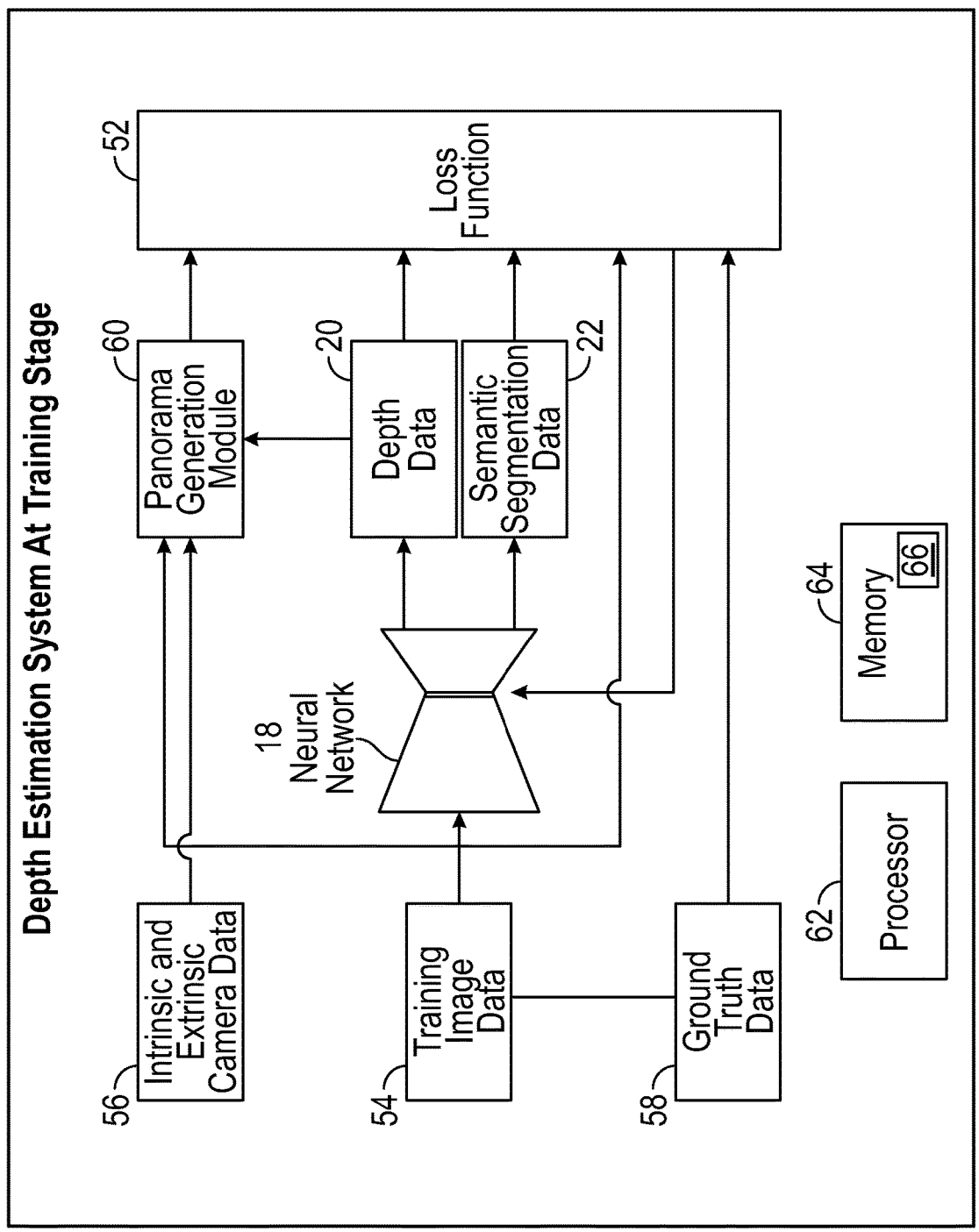
FIG. 2 is a functional block diagram of a system for depth estimation at a training stage, in accordance with an exemplary embodiment.

Continuing to refer to FIG. 1, the depth estimation system 30 includes at least one processor 24, a memory 26, and the like. The processor 24 may execute program instructions 28 stored in the memory 26. The processor 24 may refer to a central processing unit (CPU), a graphics processing unit (GPU), or a dedicated processor on which the methods and functions according to the present disclosure are performed. The memory 26 may be composed of a volatile storage medium and/or a non-volatile storage medium. For example, the memory 26 may be comprised of a read only memory (ROM) and/or a random access memory (RAM). The memory 26 stores computer program instructions 28 executed by the processor 24 in order to implement blocks, modules and method steps described herein. The methods implemented by the depth estimation system 30 include receiving the image data 16, passing the image data 16 through the neural network 18 and outputting depth data 20 and semantic segmentation data 22 at the inference stage. At the training stage, which is illustrated in FIG. 2, a loss function 52 is evaluated that includes a plurality of conceptually different loss terms, as will be described further below. The neural network 18 can be one of a variety of kinds of neural network including DNNs such as Convolutional Neural Networks (CNNs). In one embodiment, the neural network 18 is implemented with an encoder-decoder neural network architecture or as a Generative Adversarial Network (GAN).

In FIG. 2, a depth estimation system 50 at the training stage is shown. After the neural network 18 has been trained, it can be deployed in the depth estimation system 30 in the vehicle 12 at an inference stage, as shown in FIG. 1. The depth estimation system 50 at the training stage has a processor 62 and memory 64 storing computer program instructions 66. The processor 62, the memory 64 and the computer program instructions 66 can be implemented according to that described above with respect to the processor 24, the memory 26 and the computer program instructions 28 of FIG. 1. The computer program instructions 66 are executed by the processor 62 to control a training process. In the training process, the loss function 52 is calculated and optimized by iteratively adjusting weights of the neural network 18 until a maximum or minimum solution is achieved. In one embodiment, the loss function L is:

$$L = \lambda_1 \cdot L_1 + \lambda_2 \cdot \text{Smoothness} + \lambda_3 \cdot \text{SemSeg} + \lambda_4 \, \text{Panoramic} \quad \text{(equation 1)}$$

In equation 1, $L_1$ is disparity loss, which measures a difference between a disparity map derived from the depth data 20 output from the neural network 18 and ground truth depth data included in the ground truth data 58. Smoothness or disparity smoothness loss is a measure of how smooth the disparity map is at image regions outside of image edges.

Lack of disparity smoothness at image edges is given little weight, which is controlled by a smoothness control function. SemSeg or semantic segmentation loss is a measure of similarity between the semantic segmentation data 22 output from the neural network 18 and ground truth semantic segmentation data included in the ground truth data 58. Panoramic or panoramic loss is a measure of dissimilarity of image patches at overlapping regions of the input images. The overlapping regions of the input images are determined by first placing the image data from each different camera into a common global three dimensional coordinate system and then projecting the image data into an equirectangular panorama. $\lambda_1$, $\lambda_2$, $\lambda_3$ and $\lambda_4$ are tunable weighting factors. Disparity is defined as the inverse of depth.

Ground truth data 58 and training image data 54 are provided as inputs to the depth estimation system 50 at the training stage. The ground truth data 58 includes ground truth depth data and ground truth semantic segmentation data. The training image data 54 can be taken from a database of surround image data that has been recorded by cameras 14a to 14d mounted to a vehicle 12 as described above with respect to FIG. 1. The training image data 54 can be simulated in other embodiments. The ground truth data 58 can be output from the simulation when a simulation is used to generate the training image data 54. The ground truth depth data can be generated based on depth sensing capabilities of stereo camera systems, LiDAR devices, RADAR device or any other depth sensing device mounted to the vehicle 12 and working in tandem with the cameras 14a to 14d when recording the training image data 54. The semantic segmentation ground truth data can be generated by automated or human labelling of objects based the training image data 54. All manner of types of obstacles and objects may be labelled as part of the semantic segmentation output by the neural network 18 and as part of the ground truth data 58 such as other vehicles, type of vehicle, pedestrians, trees, lane markings, curbsides, cyclists, etc.

As discussed with respect to equation 1, the loss function 52 includes a plurality of loss terms, which will be described in further detail in accordance with one exemplary embodiment. Given $\{d_i^p\}$ set of predicted disparity maps and $\{d_i^{gt}\}$ set of ground truth disparity maps, then $L_1$ loss term can be calculated by:

$$\frac{1}{N}\sum_{i=1}^{N} |d_i^p - d_i^{gt}|$$ (equation 2)

Equation 2 represents a measure of the error between the depth data 20 output by the neural network 18 and the ground truth depth data. That is, equation 2 quantifies how correctly the system is inferring the depth data 20 as compared to the ground truth. Other measures of quantifying the disparity loss term can be used by the loss function 52. The set of predicted disparity maps can be derived based on an inverse of the depth maps output by the neural network 18 as part of the depth data 20. The set of ground truth disparity maps can be derived based on an inverse of the ground truth depth maps included in the ground truth depth data.

The disparity smoothness loss term of the loss function 52 is calculated by a process including first approximating input image edges $\Delta_x$, $\Delta_y$. The image edges can be detected in a variety of ways. One method converts the training image data 54, which is color image data, into grayscale intensity maps. An absolute intensity difference is determined along the x and y axes to determine intensity delta maps $\Delta_x$, $\Delta_y$. The absolute difference in disparity values is calculated for neighboring pixels to provide $D_x$, $D_y$. The disparity delta maps and the intensity delta maps are combined using the expression:

$$D_x e^{-\alpha_s \Delta_x} + D_y e^{-\alpha_s \Delta_y}$$ (equation 3)

In equation 3, $\alpha_s$ is smoothness control factor and $e^{-\alpha_s \Delta_x}$ and $e^{-\alpha_s \Delta_y}$ are smoothness control functions. Equation 3 provides a measure of smoothness in the depth data 20 output by the neural network 18 in a variable function that has less weight at determined image edges. That is, the smoothness control functions are variable so that at image edges (where $\Delta_x$, $\Delta_y$ are relatively high), the depth smoothness is multiplied by a smaller smoothness control variable than at image areas away from image edges. Image edges are defined in equation 3 as those areas with relatively large steps in image intensity. In this way, the depth smoothness constraint is applied more strictly within non image edge regions whereas local depth variations are more tolerated where depth changes would be expected at image edges. In another embodiment, the image edges could be determined in an alternative way. For example, machine learning techniques have proven to accurately locate image edges and a map of non-image edges could be generated based thereon so that depth smoothness is performed only (or is applied in a biased way) in non-image edge regions.

The semantic segmentation loss term of the loss function 52 is calculated using a categorical cross entropy function. Given predicted class $\hat{y}_i$ included in the semantic segmentation data 22 output from the neural network 18 and the ground truth class $y_i$ included in the ground truth data 58, the semantic segmentation loss term is defined as:

$$-\sum_{i=1}^{N} y_i \log \hat{y}_i$$ (equation 4)

Equation 4 is a measure of correctness of the semantic segmentation data 22 output by the neural network 18 with respect to the ground truth classification labels. Although a cross-entropy calculation is proposed, other methods are possible for quantifying the similarity between the classification prediction from the neural network 18 and the ground truth.

The panoramic loss term of the loss function 52 is computed by first creating a panoramic image from the training image data 54 in a common global coordinate frame using an image projection methodology. Overlapping image patches from the panoramic image are then extracted and an image dissimilarity measure between overlapping image patches is taken to quantify the panoramic loss term. In one exemplary embodiment, and with reference to FIG. 3A, each pixel 60 in an image 65 from one of the cameras is unprojected into a three dimensional cartesian coordinate in a local coordinate frame of the camera and using camera intrinsic parameters included in the intrinsic and extrinsic camera data 56 and the depth data 20. That is, for every u/v coordinate of a pixel 60 in the image 65, there is a corresponding coordinate in XYZ cartesian coordinates based on the camera intrinsic parameters, providing a direction vector. The direction vector is multiplied by depth included in the depth data 20 predicted by the neural network 18 to provide a full local 3D coordinate in a local cartesian coordinate frame of the camera. The 3D local coordinates derived in the previous step are transformed to global 3D coordinates by rotating and translating them using the extrinsic parameters of the camera according to the intrinsic and extrinsic camera data 56. A 3D point cloud is thus produced that is a combination of the surround images in a global, common coordinate frame. An equirectangular panorama is derived from the global 3D coordinates of each image in the surround training image data 54, by computing:

$$\varphi = \operatorname{asin}\left(\frac{z}{d}\right), \theta = \operatorname{atan}\left(\frac{x}{y}\right) \quad \text{(equation 5[MS1])}$$

Figure 3A:
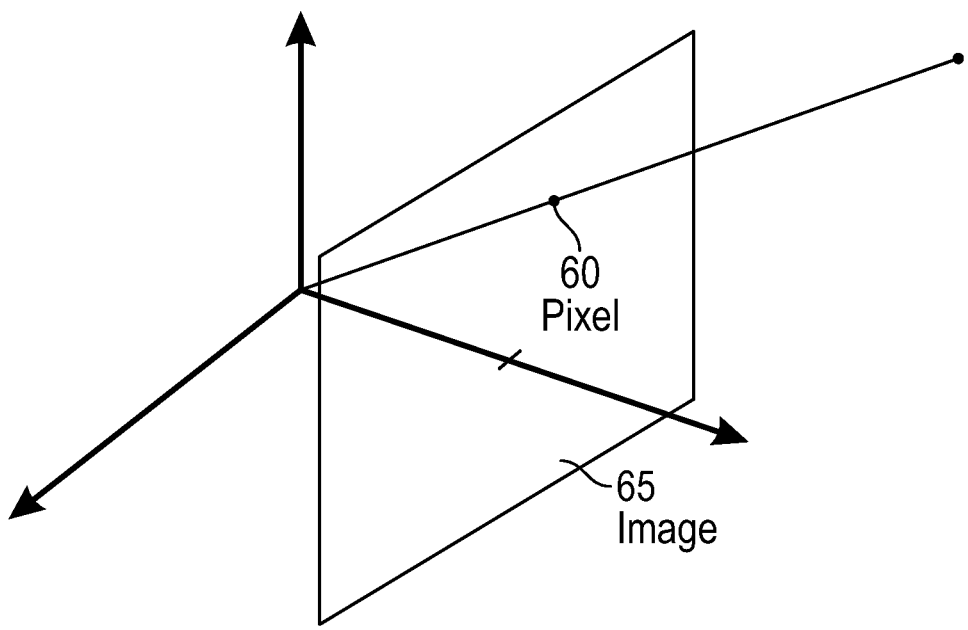
FIGS. 3A and 3B provide diagrams related to image projection, in accordance with an exemplary embodiment.
Figure 3B:
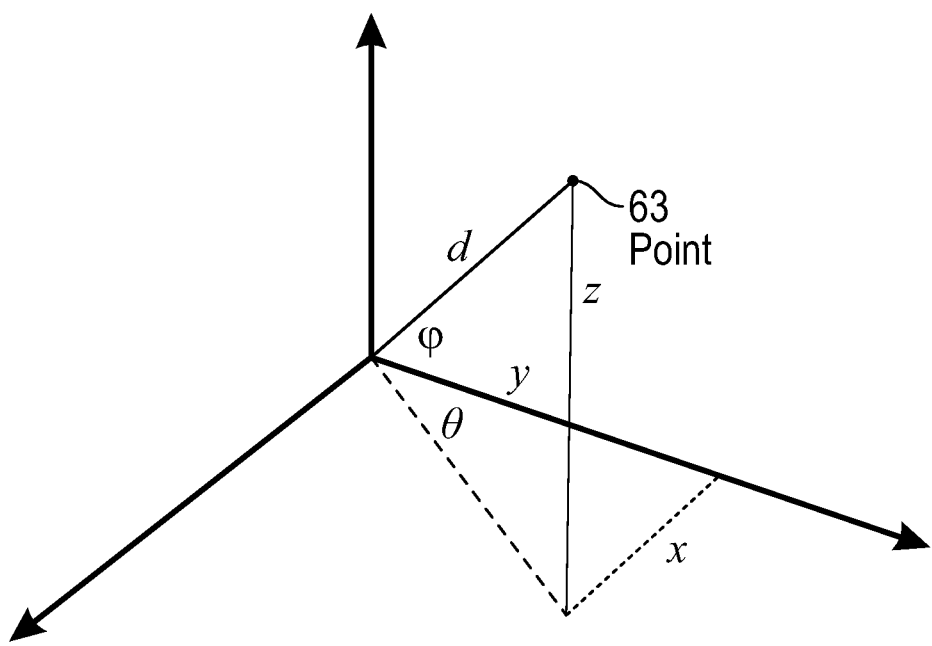

In equation 5, the distance d and the angles φ, θ can be understood with reference to FIG. 3B, which is also shows one point 63 in the panorama corresponding to the pixel 60 in the image of FIG. 3A. The x, y and z coordinates are the global 3D coordinates determined in the prior step. The equirectangular coordinates are normalized to panorama dimensions to provide a combined panoramic image where the image data from each camera partly overlaps spatially with image data from adjacent cameras. The overlapping image data in the constructed panoramic projection is extracted as overlapping image patches and a similarity measure is performed to quantify a degree of image similarity.

In one embodiment, the training image data 54 includes training image data from (or simulated as though from) pairs of adjacent cameras mounted to a vehicle 12 as shown in FIG. 1 such as a front and left camera pair, a front and right camera pair, a right and rear camera pair, and a left and rear camera pair. For the training image data 54 from each pair of adjacent cameras, a mask of overlapping regions in the panorama is created based on intersecting regions with valid data in the two cameras and a Structural Similarity Index Measure (SSIM) SSIM (for example) is computed to quantify the similarity of overlapping image patches in the constructed panorama. The SSIM function can be defined as:

$$SSIM(imagepatch1, imagepatch2) = \quad \text{(equation 6)}$$
$$\frac{(2\mu_{imagepatch1}\mu_{imagepatch2} + c_1)(2\sigma_{imagepatch1 imagepatch2} + c_2)}{(\mu^2_{imagepatch1} + \mu^2_{imagepatch2} + c_1)(\sigma^2_{imagepatch1} + \sigma^2_{imagepatch2} + c_2)}$$

Equation 6 measures a similarity between two overlapping image patches extracted from the constructed panorama. μ_ is data mean, σ_ is covariance and c are constants.

Figure 4:
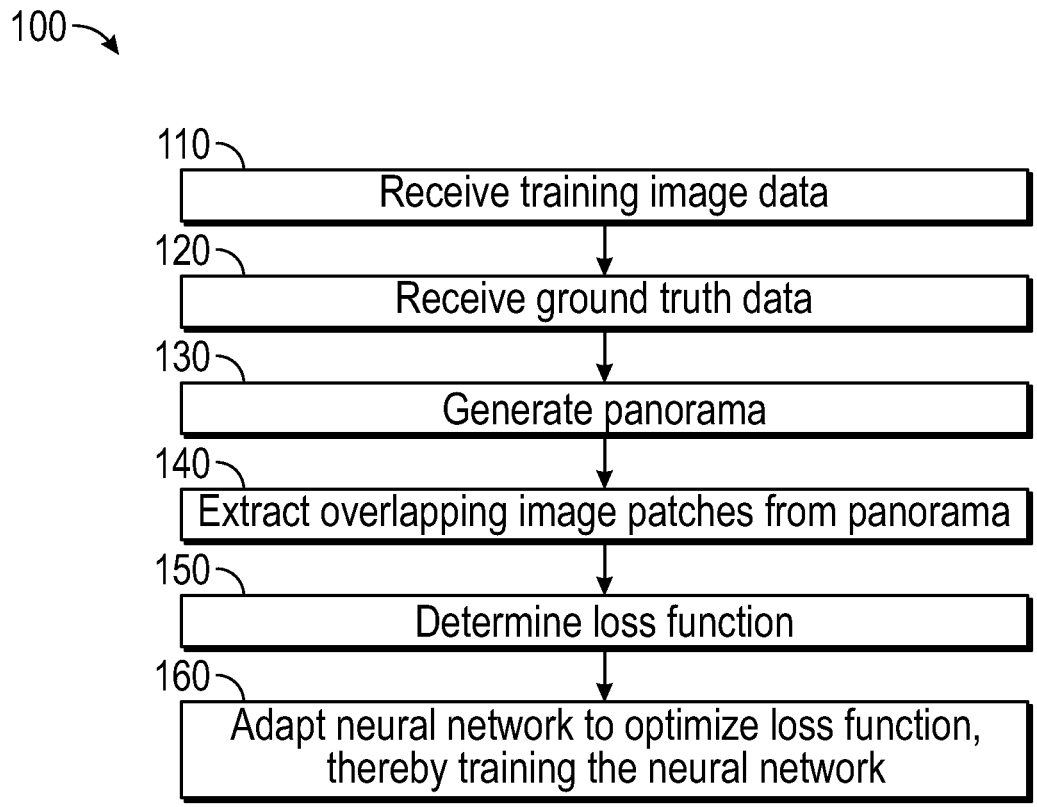
FIG. 4 is a flow chart of a method for training a neural network, in accordance with an exemplary embodiment.

Referring now to FIGS. 3 and 4, and with continued reference to FIGS. 1 and 2, the flowcharts illustrate methods 100, 200 that can be performed by the depth estimation system 30 at the inference stage of FIG. 1 and the depth estimation system 50 at the training stage in accordance with the present disclosure. As can be appreciated in light of the disclosure, the order of operation within the method is not limited to the sequential execution as illustrated in FIGS. 3 and 4, but may be performed in one or more varying orders as applicable and in accordance with the present disclosure. In various embodiments, the method 200 of FIG. 5 can be scheduled to run based on one or more predetermined events, and/or can run continuously during operation of the vehicle 12.

The exemplary method 100 of FIG. 4 is a method of training the neural network 18. The method 10 may be implemented by the processor 62 executing the programming instructions 66 as exemplified in FIG. 2. Method 100 includes a step 110 of receiving the training image data 54. The training image data 54 represents image data received from a plurality of cameras mounted to a vehicle that provide a surround view of the vehicle with adjacent cameras partially overlapping in fields of view. The training image data 54 can be simulated or obtained from an operational vehicular system. Further, the ground truth data 58 is received, which includes ground truth depth data and ground truth semantic segmentation data. The ground truth semantic segmentation data can be simulated, obtained from human labelling or artificially generated labeling. The ground truth depth data can be simulated or derived from depth sensors associated with the operational vehicular system that are registered with the fields of view of the plurality of cameras.

In step 130 a panorama image is generated from each frame of the training image data 54. The panorama image can be generated in a number of ways. In one embodiment, as described above, the panorama image is generated by transforming the image from each camera into three dimensional point cloud in a local coordinate frame of the camera using the depth data 20 output from the neural network 18. The three dimensional image or point cloud in the local coordinate frame is transformed to three dimensional coordinates in a global coordinate frame using extrinsic parameters for the camera included in the intrinsic and extrinsic camera data 56. The 3D point cloud in the global coordinate frame is projected into a combined panorama image having overlapping image patches. In step 140, overlapping image patches are extracted from the panorama.

In step 150, the loss function 52 is computed. The loss function 52 includes the plurality of loss terms as described above. In one embodiment, the loss terms include the panoramic loss term in which image similarity of the overlapping image patches from step 140 is quantified. The loss terms include the semantic segmentation that quantifies a similarity between the semantic segmentation data 22 output by the neural network and the ground truth semantic segmentation data. The loss terms may additionally include the smoothness loss term that quantifies smoothness of the depth data 20 in a way that is variable so as to carry greater weight in regions that do not correspond to edges within the image. The loss terms may additionally include the disparity loss term that quantities a similarity of the depth data 20 output from the neural network 18 and the ground truth depth data. The various loss terms are combined in a weighted sum in the loss function 52.

In step 160, the neural network 18 is adapted to optimize an evaluation of the loss function 52, thereby training the neural network 18. The optimization algorithm may be an iterative process.

Figure 5:
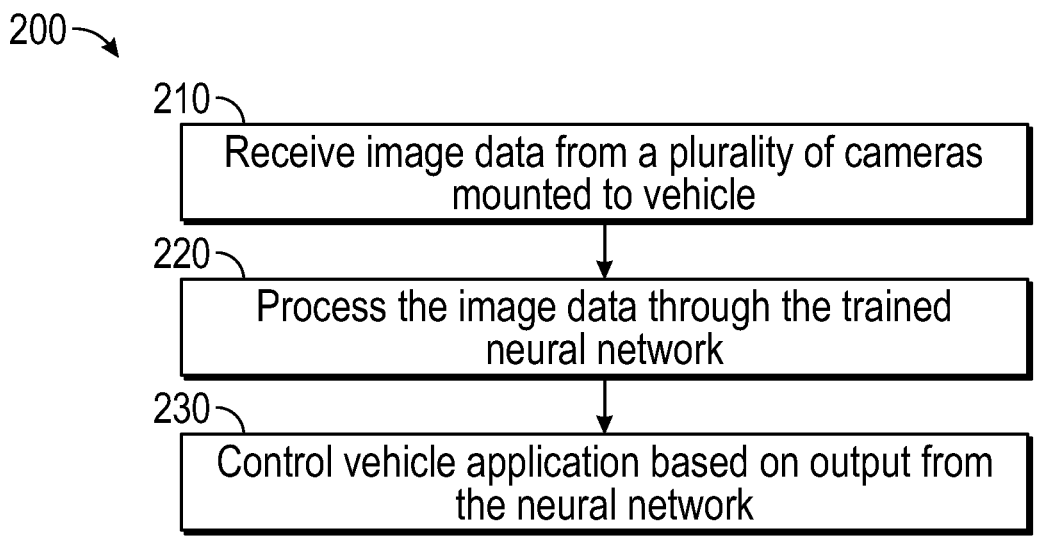
FIG. 5 is a flow chart of a method of controlling a vehicle using outputs from a trained neural network, in accordance with an exemplary embodiment.

Referring to FIG. 5, a method 200 of controlling the vehicle 12 is described. In step 210, frames of respective image data 16 are received from the plurality of cameras 14a to 14d that are arranged to provide a surround view of the vehicle 12. In step 220, the image data 16, which may be a concatenation of the respective image data received from each camera 14a to 14d, is passed through the neural network 18, which has been trained according to the exemplary method 100 of FIG. 4. The neural network 18 outputs depth data 20 and semantic segmentation data 22. In step 230, an application of the vehicle 12 is controlled based on the outputs from the neural network 18. The depth data 20 and the semantic segmentation data 22 is useful in obstacle identification, localization and tracking applications and automated control of the motion of the vehicle 12 to avoid any obstacles. Depth data 20 can also be used in stitching or splicing images from respective cameras 14a to 14d or providing surround views or changes of perspective of images from the cameras 14a to 14d. The resulting image may be displayed on an internal display screen of the vehicle 12 in a user interface control application.

It will be appreciated that the disclosed methods, systems, and vehicles may vary from those depicted in the Figures and described herein. For example, the vehicle 12, the depth estimation system 30 at inference, the depth estimation system 50 at training and/or various components thereof may vary from that depicted in FIGS. 1 and 2 and described in connection therewith. In addition, it will be appreciated that certain steps of the methods may vary from those depicted in FIGS. 4 and 5. It will similarly be appreciated that certain steps of the method described above may occur simultaneously or in a different order than that depicted in FIGS. 4 and 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof

What is claimed is:

1. A method of controlling a vehicle, the method comprising:
    receiving, via at least one processor, respective image data from at least two cameras, wherein fields of view of adjacent cameras of the at least two cameras partially overlap and wherein the at least two cameras are mounted to the vehicle;
    processing the respective image data through a neural network, wherein the neural network is trained to provide depth data and semantic segmentation data as outputs and wherein the neural network is trained using a loss function that combines a plurality of loss terms including at least a semantic segmentation loss term and a panoramic loss term, wherein the panoramic loss term includes a similarity measure regarding overlapping patches of the respective image data that each correspond to a region of overlapping fields of view of the adjacent cameras and wherein the panoramic loss term is calculated by steps including: projecting the respective image data into a combined equirectangular panoramic image; applying a mask to the combined equirectangular panoramic image so as to extract the overlapping image patches; and performing the similarity measure on the overlapping image patches to quantify the similarity of the overlapping image patches, wherein the plurality of loss terms further includes a disparity smoothness loss term, wherein disparity is inverse of depth;
    controlling, via the at least one processor, a function of the vehicle based on the depth data.

2. The method of claim 1, wherein at least four cameras are mounted to the vehicle providing a surround view of the vehicle.

3. The method of claim 1, wherein the plurality of loss terms includes a disparity loss term, wherein disparity is inverse of depth.

4. The method of claim 1, wherein the disparity smoothness loss term is variable so as to be lower at image edges.

5. The method of claim 1, comprising controlling, via the at least one processor, the function of the vehicle based on the depth data and the semantic segmentation data.

6. The method of claim 1, comprising performing obstacle detection and avoidance processing based on the depth data and the semantic segmentation data and controlling at least one of steering, braking and propulsion of the vehicle based on the output of the obstacle detection and avoidance processing.

7. A method of training a neural network and using the trained neural network to control a vehicle, the method comprising:
    receiving, via at least one processor, respective training image data representing image data received from at least two cameras, wherein fields of view of adjacent cameras of the at least two cameras partially overlap;
    processing the respective training image data through a neural network providing depth data and semantic segmentation data as outputs;
    receiving, via the at least one processor, ground truth data including ground truth semantic segmentation data;
    training, via the at least one processor, the neural network based on a loss function, wherein the loss function combines a plurality of loss terms including at least a semantic segmentation loss term and a panoramic loss term;
    wherein the panoramic loss term includes a similarity measure regarding overlapping image patches of the respective training image data that each correspond to a region of overlapping fields of view of the adjacent cameras, and wherein the panoramic loss term is calculated by steps including:
    projecting the respective image data into a combined equirectangular panoramic image;
    applying a mask to the combined equirectangular panoramic image so as to extract the overlapping image patches; and
    performing the similarity measure on the overlapping image patches to quantify the similarity of the overlapping image patches;
    wherein the semantic segmentation loss term quantifies a difference between the ground truth semantic segmentation data and the semantic segmentation data output from the neural network; and
    wherein the plurality of loss terms further includes a disparity smoothness loss term, wherein disparity is inverse of depth;
    using the trained neural network to process image data received from at least two vehicle cameras mounted to the vehicle, wherein fields of view of adjacent vehicle cameras of the at least two vehicle cameras partially overlap, thereby providing live depth data and live semantic segmentation data as outputs;
    controlling, via the at least one processor, a function of the vehicle based on the live depth data.

8. The method of claim 7, wherein at least four vehicle cameras are mounted to the vehicle providing a surround view of the vehicle.

9. The method of claim 7, wherein the ground truth data includes ground truth disparity data, and wherein the disparity smoothness loss term quantifies a difference between the ground truth disparity data and disparity data derived from the depth data output from the neural network.

10. The method of claim 7, wherein the disparity smoothness term quantifies a smoothness of disparity data that is derived from the depth data output from the neural network.

11. The method of claim 10, wherein the disparity smoothness loss term is variable so as to have lower values at image edges.

12. The method of claim 10, wherein the disparity smoothness loss term is calculated by steps including:
 finding image edges; and
 applying a smoothness control function that varies based on the found image edges.

13. The method of claim 12, wherein the image edges are determined based on evaluating local image intensity changes.

14. The method of claim 7, comprising controlling, via the at least one processor, the function of the vehicle based on the depth data and the semantic segmentation data.

15. A vehicle, the vehicle comprising:
 at least two cameras, wherein fields of view of adjacent cameras of the at least two cameras partially overlap and wherein the at least two cameras are mounted to the vehicle;
 at least one processor in operable communication with the at least two cameras, the at least one processor configured to execute program instructions, wherein the program instructions are configured to cause the at least one processor to:
 receive respective image data from the at least two cameras;
 process the respective image data through a neural network, wherein the neural network is trained to provide depth data and semantic segmentation data as outputs and wherein the neural network is trained using a loss function that combines a plurality of loss terms including at least a semantic segmentation loss term and a panoramic loss term, wherein the panoramic loss term includes a similarity measure regarding overlapping patches of the respective image data that each correspond to a region of overlapping fields of view of the adjacent cameras, and wherein the panoramic loss term is calculated by steps including: projecting the respective image data into a combined equirectangular panoramic image;
 applying a mask to the combined equirectangular panoramic image so as to extract the overlapping image patches; and performing the similarity measure on the overlapping image patches to quantify the similarity of the overlapping image patches, wherein the plurality of loss terms further includes a disparity smoothness loss term, wherein disparity is inverse of depth; and
 control a function of the vehicle based on the depth data.

16. The vehicle of claim 15, wherein at least four cameras are mounted to the vehicle providing a surround view of the vehicle.

17. The vehicle of claim 15, wherein the disparity smoothness loss term is variable so as to have lower values at image edges.

* * * * *